United States Patent [19]

Horie

[11] Patent Number: 5,691,694
[45] Date of Patent: Nov. 25, 1997

[54] METHOD FOR ALARMING OF TIRE DEFLATION AND APPARATUS THEREFOR

[75] Inventor: Hiroto Horie, Akashi, Japan

[73] Assignees: Sumitomo Rubber Industries, Ltd., Hyogo-ken; Sumitomo Electric Industries, Ltd., Osaka-fu, both of Japan

[21] Appl. No.: 531,898

[22] Filed: Sep. 22, 1995

[30] Foreign Application Priority Data

Sep. 27, 1994 [JP] Japan .................................. 6-231622

[51] Int. Cl.$^6$ .................................................. B60C 23/00
[52] U.S. Cl. ..................... 340/442; 340/443; 340/457.4; 340/309.15; 73/146.2; 73/146.5
[58] Field of Search ........................ 340/442, 443, 340/444, 447, 457, 457.4, 309.15, 636, 669, 438, 425.5; 73/146, 146.2, 146.5; 116/34 R

[56] References Cited

U.S. PATENT DOCUMENTS

| | | | |
|---|---|---|---|
| 4,478,521 | 10/1984 | Evans et al. | 340/457.4 |
| 4,574,267 | 3/1986 | Jones | 340/443 |
| 4,612,623 | 9/1986 | Bazarnik | 340/457.4 |
| 4,839,749 | 6/1989 | Franklin | 340/457 |
| 5,006,829 | 4/1991 | Miyamoto et al. | 340/457.4 |
| 5,054,315 | 10/1991 | Dosjoub | 340/442 |
| 5,239,469 | 8/1993 | Walker | 340/442 |

FOREIGN PATENT DOCUMENTS

| | | |
|---|---|---|
| 0601556 | 6/1994 | European Pat. Off. . |
| 2680137 | 2/1993 | France . |
| 3718471 | 12/1988 | Germany . |
| 4426734 | 2/1995 | Germany . |
| 1202506 | 11/1989 | Japan . |
| 4-271907 | 9/1992 | Japan . |

*Primary Examiner*—Brent A. Swarthout
*Assistant Examiner*—Van T. Trieu
*Attorney, Agent, or Firm*—Birch, Stewart, Kolasch & Birch, LLP.

[57] ABSTRACT

A tire deflation alarm apparatus to be provided on a vehicle with air-filled tires, comprising: a timer for measuring a period of time from when the air pressure of a tire is set to a normal value to the time when the air pressure spontaneously drops to a dangerous value, the period of time being established beforehand; an alarm portion connected to the timer and designed to give an alarm after the period of time has elapsed; and a reset switch for resetting the timer to the zero hour. The apparatus is capable of warning the tire's spontaneous air pressure drop that inevitably occurs when allowed to stand.

4 Claims, 3 Drawing Sheets

METHOD FOR ALARMING OF TIRE DEFLATION AND APPARATUS THEREFOR

BACKGROUND OF THE INVENTION

The present invention relates to a tire deflation alarm apparatus and more particularly to a tire deflation alarm apparatus which warns a driver of the possibility that the air pressure in a tire which has been set to a prescribed normal pressure is spontaneously lowered to a dangerous value.

In general, the pressure of an air-filled tire drops due to abrupt factors such as a puncture or valve damage. However, the drop of air pressure might be caused by natural factors such as an air leak from an inner liner whereby the air pressure might be reduced to a dangerous value before one becomes aware. When one continues driving in such a state, the tire is deformed causing heat to be generated, which, in a worst case scenario might burst, causing a serious accident. Thus, there have been proposed many devices which warn of abnormal air pressure in the tire.

For example, Japanese Unexamined Patent Publication No. 271907/1992 discloses a method in which the inside pressure drop is detected from a relative difference in the number of revolutions of the tires, and Japanese Unexamined Utility Model Publication No. 115958/1979 discloses a method in which the pressure of a tire is directly detected.

However, the method in which the inside pressure drop is detected from a relative difference in the number of revolutions as disclosed in Japanese Unexamined Patent Publication No. 271907/1992 poses a problem that it is impossible to detect the pressure drop in the case where the pressure of all the tires is reduced similarly.

In fact, when the air pressure reaches a dangerous value due to natural causes, it is impossible to detect the pressure drop with this method because the air pressure of the four wheels drops with approximately a uniform inclination as shown in FIG. 2.

Table 1 shows the degree of air pressure drop of a tire due to natural factors, indicating the relationship between the number of days allowed to stand and the air pressure ($kgf/cm^2$).

TABLE 1

Tire Size: 185/65R14

| Number of days allowed to stand | Air pressure ($kgf/cm^2$) | |
| --- | --- | --- |
| 0 | 2.00 | 3.00 |
| 30 | 1.84 | 2.78 |
| 58 | 1.79 | 2.70 |
| 90 | 1.65 | 2.52 |
| 135 | 1.59 | 2.41 |

FIG. 2 is a graphical representation of Table 1. As shown in FIG. 2, it is expected that the inside pressure of an air-filled tire spontaneously drops by at least 0.5 bar in 6 months only by being allowed to stand. Thus, there is an enough possibility that the air pressure of all four wheels similarly drops to a dangerous value even if they are not punctured. In such an occasion, it is impossible to detect any abnormality with a method in which the inside pressure drop is detected from a relative difference in the number of revolutions of tires.

Moreover, the method disclosed in Japanese Unexamined Utility Model Publication No. 115958/1979 in which the air pressure of a tire is directly detected, requires high cost since sensors corresponding to the number of tires are necessary, which poses a problem that the measured value lacks in reliability since it is necessary to set a slip ring or the like to connect the sensor to a rolling element, i.e. a tire.

The present invention was made to solve the above-mentioned problems, and therefore it is an object of the present invention to provide an economical apparatus for alarming tire deflation capable of warning a person of possibility of spontaneous air pressure drop of a tire.

SUMMARY OF THE INVENTION

In accordance with the present invention, there is provided a tire deflation alarm apparatus to be provided on a vehicle with air-filled tires, comprising: a timer for measuring a period of time from when the air pressure of a tire has been set to a prescribed normal value till when the air pressure spontaneously drops to a dangerous value, the period of time being assumed beforehand. An alarm part is connected to the timer and designed to give an alarm after the period of time has elapsed; and a reset switch is provided for resetting the timer to zero hour.

It is desirable that a backup battery and a charging circuit are connected to the timer and the period of time is measured, without power being cut off, by means of the backup battery and the charging circuit. It is also desirable that the period of time measured is 6 months.

In the apparatus for alarming tire deflation of the present invention, the period of time from when air pressure of a tire has been set to a prescribed normal pressure till when the air pressure drops to reach a dangerous value is assumed beforehand and then, the period of time is measured by the timer to inform the driver through the alarm portion. The reset switch resets the timer to the zero hour.

When a backup battery and a charging circuit are connected to the timer, the power supply is prevented from being cut off by the battery backup so that it is possible to continuously measure the period of time even when the engine is not running.

As shown in FIG. 3, the 1.9 bar to 2.0 bar pressure generally prescribed as the inside pressure normally drops to 1.4 bar pressure in 6 months so that, assuming that the period of time the timer measures is 6 months, it is possible to inform the driver of the danger of slippage caused during cornering due to a reduction in the cornering performance caused by this pressure drop.

DETAILED DESCRIPTION

Figure 1:
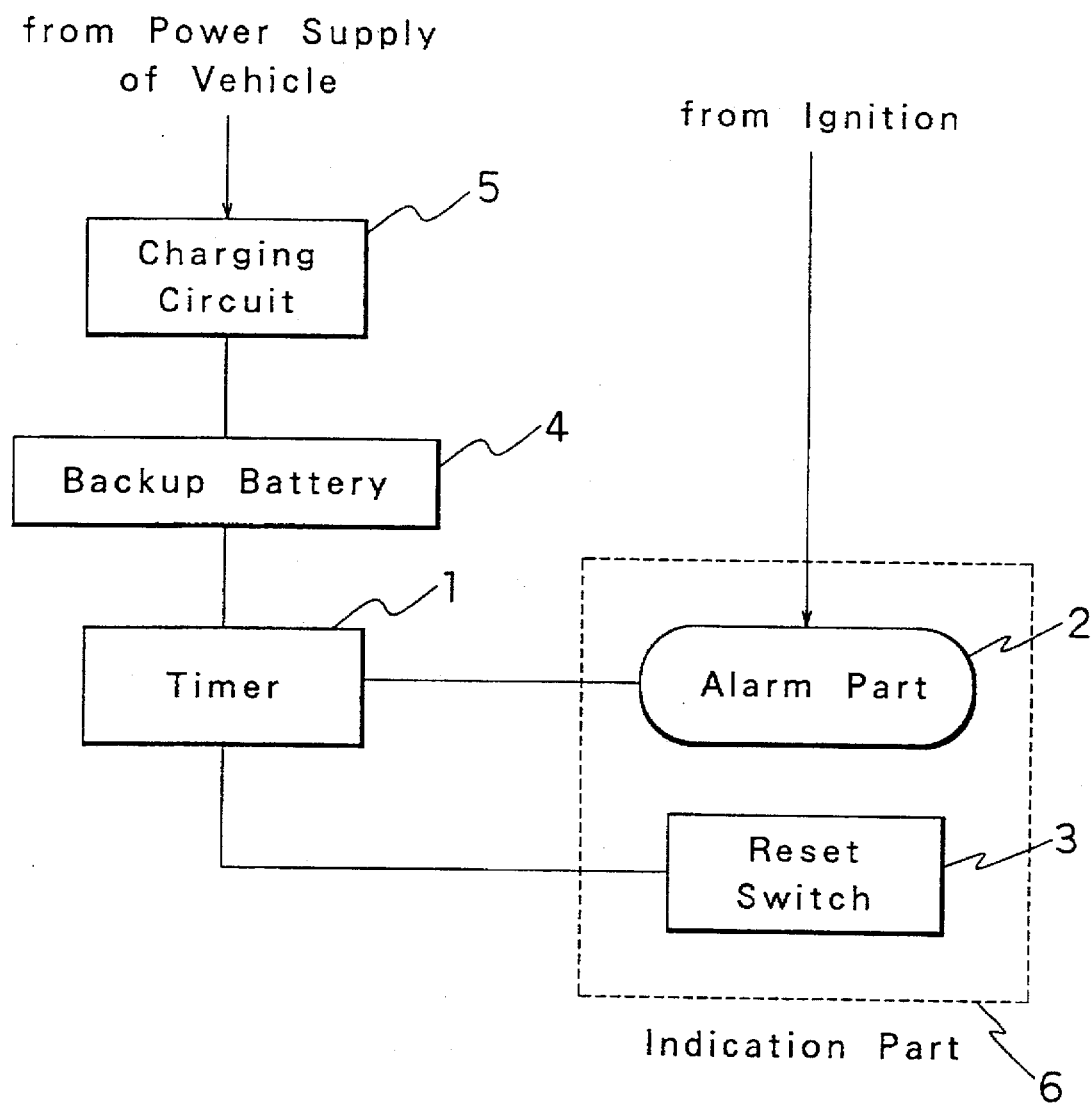
FIG. 1 shows a circuit diagram of an apparatus for alarming tire deflation of the present invention.

An apparatus for the tire deflation alarm of the present invention is described below referring to FIG. 1. The apparatus of the present invention comprises a timer 1, an alarm part 2, a reset switch 3, a backup battery 4, and a charging circuit 5.

A digital circuit with low power consumption wherein an oscillator is combined with a plurality of counter ICs can be used for the timer 1 to measure the period of time where the tire's air pressure that is assumed on the basis of Tables 1 and 2, spontaneously drops to reach a dangerous value. It is desirable that this period of time is set to 6 months. In general, it is expected that the tire's air pressure spontaneously drops by at least 0.5 bar in 6 months so that, when the air pressure of a tire whose normal air pressure is 2.00 bar, drops by 0.5 bar, the inside air pressure becomes 1.5 bar which poses a problem that the side wall of the tire shows elastic fatigue and can be easily broken. Thus, it is necessary to urge the driver to take the necessary steps to eliminate this problem. Moreover, this period of 6 months is just an example of a desirable period so that the apparatus of the present invention it not limited to one which gives an alarm in response to an elapsed period of 6 months.

The alarm part 2 is provided to arouse the attention of the driver, and is connected to the timer 1. When the timer 1 counts 6 months, a switch in the alarm part 2 is turned on to give an alarm, It is possible to use visual indicators such as a warning lamp or a multiple display other than those utilizing an aural effect such as a buzzer, an electronic beep or voice sound. The multiple display is not a display that only indicates one piece of information with the use of an ON/OFF position like a warning lamp, but rather a display that indicates multiple information at one position by using characters and pictures.

The reset switch 3 is provided for resetting the timer 1 is that just after the inside pressure is adjusted to a normal value by replacing a tire or supplying air to the tire, the reset switch resets the timer 1 to 0 hour.

It is desirable that the alarm part 2 and the reset switch 3 are arranged within an indication part 6 to and provided in a position such as in the front of the driver seat of a vehicle so that the driver can operate the reset switch 3 provided on the indication part 6 after completing the adjustment as described above.

Figure 2:
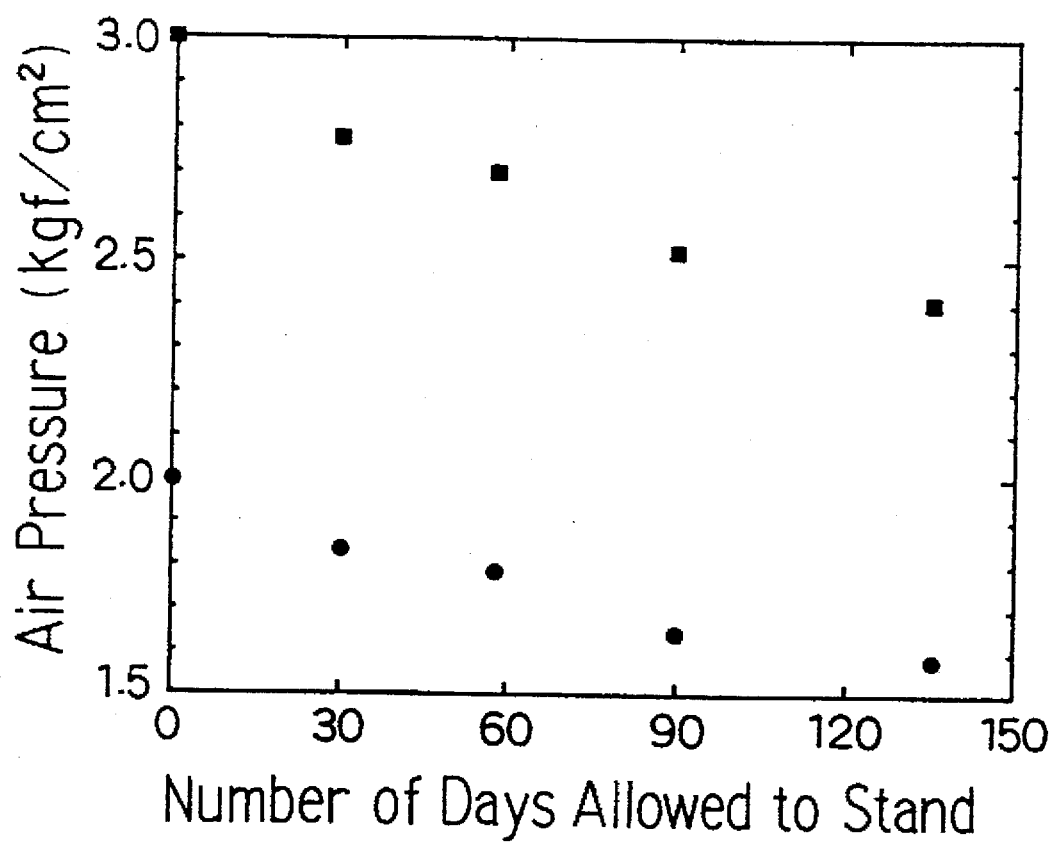
FIG. 2 shows the degree of spontaneous air pressure drop.
Figure 3:
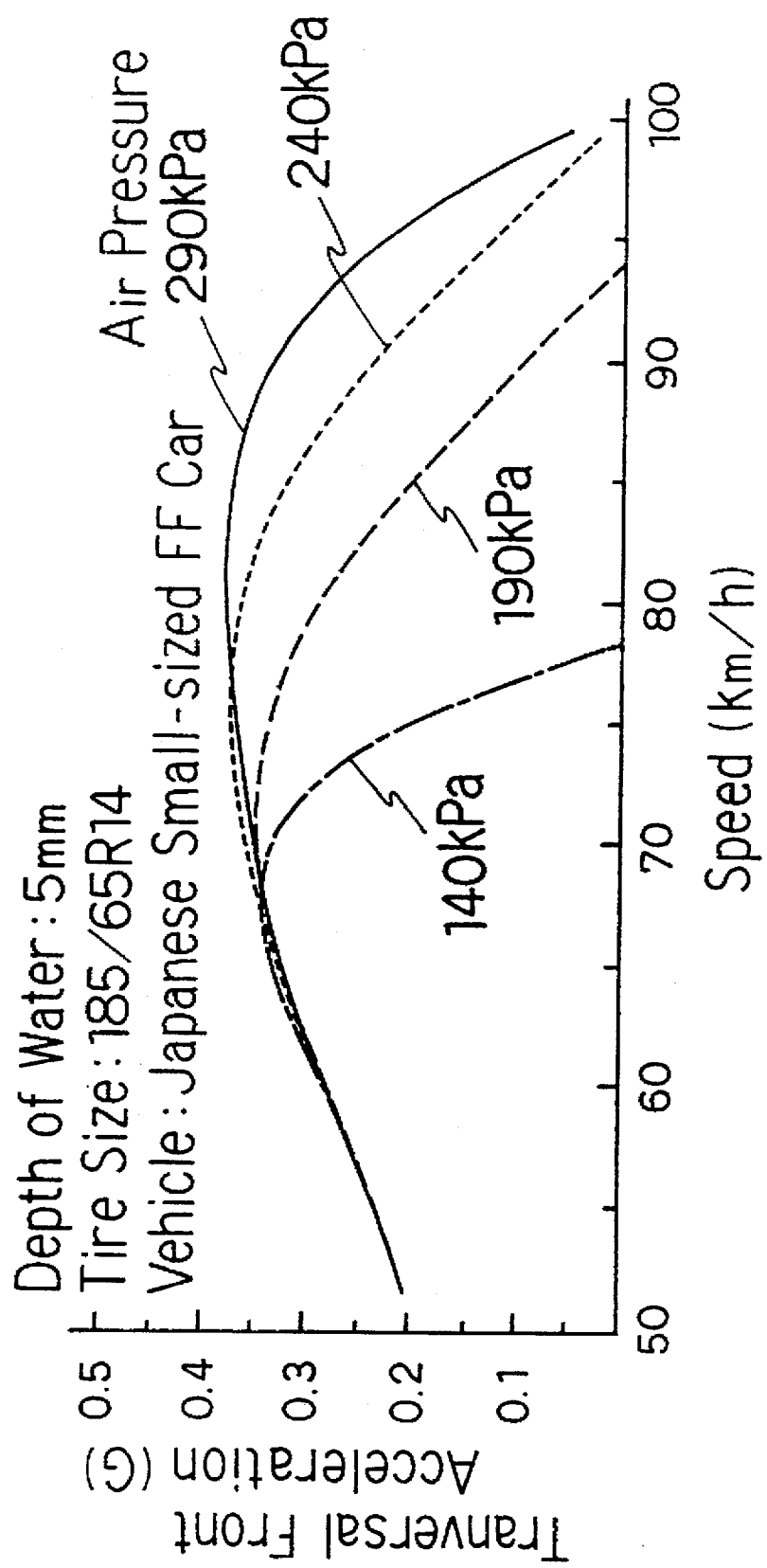
FIG. 3 shows the relationship between speed and transversal front acceleration in relation to difference in the air pressure.

Explained hereafter is the function of the tire deflation alarm constituted as described above. At first, the tire's air pressure for all the wheels is adjusted to a prescribed normal inside pressure. Then, when the reset switch 3 is pressed, the timer 1 is reset, and the timer counts a period of time starting with a 0 hour. From Table 1 and FIG. 2, it is expected that the tire's inside pressure will reach a dangerously low value when 6 months have elapsed after the air pressure was adjusted, so that the timer 1 is set to measure 6 months beforehand. Thus, when 6 months have elapsed, the alarm part 2 gives an alarm.

However, it is necessary to continue counting without being cleared even when the ignition is turned off or the battery is disconnected so that it is necessary for the timer 1 to be constantly powered. For this reason, the apparatus is equipped with the backup battery 4 and charging circuit 5 for that battery. The alarm section 2 gives an alarm in accordance with the alarm instruction from the timer 1 when the ignition is turned on.

The tire deflation alarm apparatus of the present invention is capable of warning when the tire's spontaneous air pressure drops, which inevitably occurs when allowed to stand, and is also very low-cost.

Though several embodiments of the present invention are described above, it is to be understood that the present invention is not limited only to the above-mentioned and various changes and modifications might be made in the invention without departing from the spirit and scope thereof.

What is claimed is:

1. A tire deflation alarm apparatus adapted to be provided on a vehicle which utilizes air-filled tires, comprising:

a timer for measuring a period of time from when the air pressure of the tire has been set to a normal value to the time when the air pressure spontaneously drops to a dangerous value, the period of time being established beforehand;

an alarm means connected to the timer and designed to give an alarm after the period of time has elapsed;

a reset switch for resetting the timer to the zero hour; and a backup battery and charging circuit connected to the timer so that the period of time can be measured when the power is cut off, by means of the backup battery and the charging circuit.

2. The apparatus of claim 1, wherein the period of time measured by the timer is 6 months.

3. The apparatus of claim 1, wherein the period of time measured by the timer is 6 months.

4. A method for measuring the deflation of a vehicle tire and providing a warning of said deflation which comprises:

measuring the period of time from when the air pressure of a tire drops from a normal value to a dangerously low value, said period of time being predetermined;

signaling an alarm when said period of time has elapsed;

providing a backup battery and charging circuit for measuring the time period when the power is cut off; and resetting the time period to zero.

* * * * *